US009706457B2

(12) United States Patent
Sun et al.

(10) Patent No.: US 9,706,457 B2
(45) Date of Patent: Jul. 11, 2017

(54) METHODS AND DEVICES FOR SECTOR SELECTION

(71) Applicant: TELEFONAKTIEBOLAGET L M ERICSSON (PUBL), Stockholm (SE)

(72) Inventors: Ying Sun, Sundbyberg (SE); Zelimir Bajzec, Sundbyberg (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

(21) Appl. No.: 14/908,289

(22) PCT Filed: Jul. 29, 2013

(86) PCT No.: PCT/SE2013/050936
§ 371 (c)(1),
(2) Date: Jan. 28, 2016

(87) PCT Pub. No.: WO2015/016753
PCT Pub. Date: Feb. 5, 2015

(65) Prior Publication Data
US 2016/0174116 A1    Jun. 16, 2016

(51) Int. Cl.
*H04W 36/00* (2009.01)
*H04W 24/00* (2009.01)
*H04L 27/26* (2006.01)

(52) U.S. Cl.
CPC ..... *H04W 36/0083* (2013.01); *H04L 27/2647* (2013.01); *H04W 24/00* (2013.01)

(58) Field of Classification Search
CPC ..... H04W 36/30; H04W 24/00; H04W 28/00; H04L 27/2647

USPC ........ 455/443, 452.2, 453; 370/210
See application file for complete search history.

(56) References Cited

U.S. PATENT DOCUMENTS

| 7,933,604 B1 * | 4/2011 | Rai ........ H04W 48/20 370/331 |
| 2005/0181834 A1 * | 8/2005 | Chen ........ H04L 1/1845 455/562.1 |
| 2008/0309554 A1 * | 12/2008 | Venkatesan ........ H04B 7/022 342/367 |

(Continued)

OTHER PUBLICATIONS

Xu, et al., Fast Cell Group Selection Scheme for Improving Downlink Cell Edge Performance, 2006 International Conference on Communications, Circuits and Systems, Jun. 1, 2006, p. 1382-1386.

(Continued)

*Primary Examiner* — Danh Le

(57) ABSTRACT

The present teachings relates to a method for sector selection performed in a network node of a communication system. The communication system comprises two or more sectors using a common cell identification, the two or more sectors each providing uplink and/or downlink connections to wireless devices located within a coverage area of the sectors. The method comprises: estimating, for a wireless device, a sector combining gain, wherein the sector combining gain is related to an increment in spectrum efficiency for the wireless device, and selecting one or more of the sectors for use by the wireless device based on an adjustable sector selection criterion, wherein a sector is selected if the estimated sector combining gain fulfills the adjustable sector selection criterion.

13 Claims, 3 Drawing Sheets

(56) References Cited

U.S. PATENT DOCUMENTS

| | | | |
|---|---|---|---|
| 2009/0245089 A1* | 10/2009 | Kandukuri Narayan | H04B 1/707 370/210 |
| 2010/0069010 A1* | 3/2010 | Karakayali | H04B 7/024 455/63.1 |
| 2013/0058307 A1* | 3/2013 | Kim | H04B 7/024 370/329 |
| 2013/0301455 A1* | 11/2013 | Jung | H04W 72/0406 370/252 |
| 2015/0103737 A1* | 4/2015 | Balachandran | H04B 1/10 370/328 |

OTHER PUBLICATIONS

Huiyu, et al., Performance Evaluation of Coordinated Multipoint Reception in CRAN Under LTE-Advanced Uplink, 2012 7th International ICST Conference on Communications and Networking in China (CHINACOM), Aug. 8, 2012, p. 778-782.

3GPP TR 36.913 V11.0.0, 3rd Generation Partnership Project; Technical Specification Group Radio Access Network; Requirements for further advancements for Evolved Universal Terrestrial Radio Access (E-UTRA) (LTE-Advanced) (Release 11), Sep. 24, 2012.

3GPP TSG RAN WG1 Ad Hoc on LTE, R1-050615, Investigations on Inter-Sector Diversity in Evolved UTRA Downlink, NTT DoCoMo, Sophia Antipolis, France, Jun. 20-21, 2005.

* cited by examiner

METHODS AND DEVICES FOR SECTOR SELECTION

This application is a 371 of International Application No. PCT/SE2013/050936, filed Jul. 29, 2013, the disclosure of which is fully incorporated herein by reference.

TECHNICAL FIELD

The technology disclosed herein relates generally to the field of wireless communication networks, and in particular to resource usage within such communication networks.

BACKGROUND

In a conventional Long Term Evolution (LTE) deployment a number of network nodes, in particular eNodeBs (E-UTRAN Node B or evolved Node B, also denoted eNB), are deployed to provide coverage in a certain area. Each eNodeB can manage one or more cells and also manage all devices, e.g. wireless user equipment, residing within the coverage area of those cells.

From the perspective of the wireless device, the different cells are distinguished by a physical-layer cell identity (PCI) which is defined in 3GPP specification TS 36.211, ch 6.11. In a typical deployment scenario, neighboring cells have different PCIs and when the wireless devices are in a connected state they use these PCIs as an identifier for handover measurements.

Cell merging, also denoted shared cell, combined cell or multi-sector cell in some cases, is a new cell configuration for LTE and enables a multi Radio Resource Unit (RRU) deployment without needing to care about cell planning from a Radio Frequency (RF) reuse perspective; the same radio frequencies are used by all RRUs. The shared cell is achieved by allowing the different RRUs to use the same PCI and thus the wireless device considers all RRUs to be part of the same cell. The spatially separated RRU or a group of RRUs are called sector (or sector carriers). The cell can contain multiple sectors, and a wireless device can belong to one sector or multiple sectors depending on the degree of sector isolation. Insufficient isolation between sectors that are identified identically, as is the case when reusing the PCI, can cause interference and thus reduce communication quality.

FIGS. 1a and 1b illustrate examples of the concepts of different cells (FIG. 1a) and shared cell (FIG. 1b), respectively, used in heterogeneous-network deployment. These cell concepts have been seen as solutions for providing higher data rates and increased traffic capacity thereby meeting expectations of the rapidly growing mobile broadband. In a heterogeneous network 1, low power nodes (e.g. pico nodes) 3, 4 are placed throughout a high power node 2 (e.g. macro node) layout, providing pico cells within a macro cell. The macro node 2 and pico nodes 3, 4 can be deployed as separate cells (cells A, B and C in FIG. 1a) or as a shared cell (cell A in FIG. 1b). In the shared cell deployment, the same cell ID (e.g. PCI) is shared by a number of pico nodes 3, 4 and the macro node 2. The pico and macro nodes may also be denoted sectors.

There are several benefits with the shared cell deployment. A first benefit is the possibility of decoupling uplink reception and downlink transmission, which allows flexible network operation in that the reception points and transmission points may be selected independently of each other. This flexibility further provides a possibility of saving energy by muting some of the transmission points or reception points. Furthermore, in the shared cell concept not only uplink and downlink but also channels thereon can be completely decoupled, e.g. data channel and control channel transmitted on the downlink may be decoupled. It is possible to broadcast control channel in all sectors while selectively transmitting the data channel in some of the sectors; it is also possible to only transmit control information in macro to provide basic coverage, including system information, control and reference signals, while using pico to transmit data to enhance capacity and data rates.

Still further benefits of shared cell deployment comprise easy cell planning; since all sectors belong to the same cell, there is less concern about inter-cell interference. Further, there is some reduction in control signaling because there is no need to perform handover within the shared cell. Further, since it is possible to perform joint reception from different sectors (in uplink) and multi-point transmission (in downlink) in a shared cell, signal quality can be enhanced and thus higher spectrum efficiency can be achieved.

However, when combing different cells into one cell with a single PCI, the capacity will be limited by the cell specific physical resources, such as frequency bandwidth. Spatial Division Multiplexing (SDM) is introduced to improve capacity. In contrast to the basic LTE cell configuration, where all wireless devices camped in a cell share cell resources by time- and/or frequency multiplexing, there is yet another resource domain to use in a shared cell with SDM, namely spatial resource. Wireless devices that are spatially separated with good sector isolation can use the same time and frequency resource, but on different sectors.

In view of the scarce resources that are available in the shared cell concept, improvements in regard of the resource usage are sought for.

SUMMARY

In a shared cell, the choice of sector used for uplink receptions and downlink transmissions is based on isolation degree. The isolation degree is defined as the filtered channel quality difference between the different sectors. The eNodeB compares the isolation degree with a predefined threshold to decide if the sector is to perform reception and/or transmission or not to be used at all for a particular wireless device. The sector is selected if the isolation degree is smaller than the threshold. Otherwise, it is not selected.

A prevailing assumption is thus that the isolation requirement is the same in the entire cell, and the same isolation degree threshold is used for all wireless devices in the cell. In reality, the isolation requirement might be different for different users in a cell.

Furthermore, with the fixed isolation threshold a handover problem arises in situations where there is an imbalance between uplink and downlink and imbalance between data and control channel. One example is that a handover failure might happen when the wireless device moves to the new cell due to a poorer uplink reception quality since fewer uplink sectors are selected. That is because the handover decision is based on reference signal received power (RSRP) measurements, which is measured on the broadcasted cell-specific reference signal (CRS) from all sectors independently of isolation, whereas the sectors used for the other channels are selected in dependence on the isolation. Fewer uplink sectors are selected because of the irregularity of the network in different cells, that is, the fixed isolation degree threshold which is fit for one cell might be not optimized in another cell.

An object of the present teachings is to overcome or at least alleviate one or more of the above short-comings.

The object is according to a first aspect achieved by a method for sector selection performed in a network node of a communication system. The communication system comprises two or more sectors using a common cell identification, and the two or more sectors each provides uplink and/or downlink connections to wireless devices located within a coverage area of the sectors. The method comprises: estimating, for a wireless device, a sector combining gain, wherein the sector combining gain is related to an increment in spectrum efficiency for the wireless device; and selecting some one or more of the sectors for use by the wireless device based on an adjustable sector selection criterion, wherein a sector is selected if the estimated sector combining gain fulfills the adjustable sector selection criterion.

By estimating a sector combining gain and using it in an adjustable sector selection criterion, problems related to the prior art use of the fixed isolation degree is overcome. Instead of the prior art fixed sector selection isolation degree threshold, the method uses the actual spectrum efficiency gain of adding a sector when deciding if the sector should be selected. Improved resource utilization efficiency and user experienced performance can be achieved.

The object is according to a second aspect achieved by a network node of a communication system configured for sector selection. The communication system comprises two or more sectors using a common cell identification. The two or more sectors each provides uplink and/or downlink connections to wireless devices located within a coverage area of the sectors. The network node comprises a and memory, the memory containing instructions executable by the processor, whereby the network node is operative to: estimate, for a wireless device, a sector combining gain, wherein the sector combining gain is related to an increment in spectrum efficiency for the wireless device; and select one or more of the sectors for use by the wireless device based on an adjustable sector selection criterion, wherein a sector is selected if the estimated sector combining gain fulfills the adjustable sector selection criterion.

The object is according to a third aspect achieved by a computer program for a network node of a communication system configured for sector selection. The communication system comprises two or more sectors using a common cell identification. The two or more sectors each provides uplink and/or downlink connections to wireless devices located within a coverage area of the sectors. The computer program comprises computer program code, which, when run on the network node causes the network node to: estimate, for a wireless device, a sector combining gain, wherein the sector combining gain is related to an increment in spectrum efficiency for the wireless device; and select one or more of the sectors for use by the wireless device based on an adjustable sector selection criterion, wherein a sector is selected if the estimated sector combining gain fulfills the adjustable sector selection criterion.

The object is according to a fourth aspect achieved by a computer program product comprising a computer program as above, and a computer readable means on which the computer program is stored.

Further features and advantages of the present teachings will become clear upon reading the following description and the accompanying drawings.

DETAILED DESCRIPTION

Figure 1A:
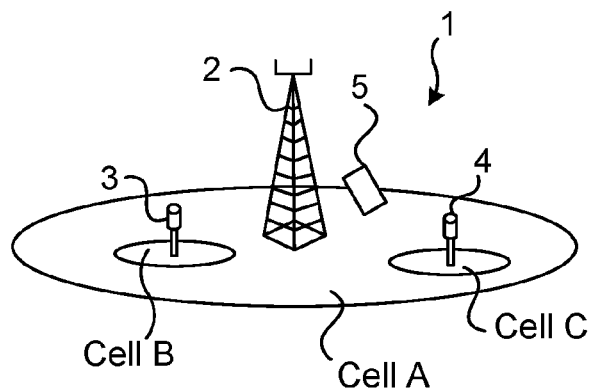
FIG. 1a illustrates a deployment scenario comprising different cells.
Figure 1B:
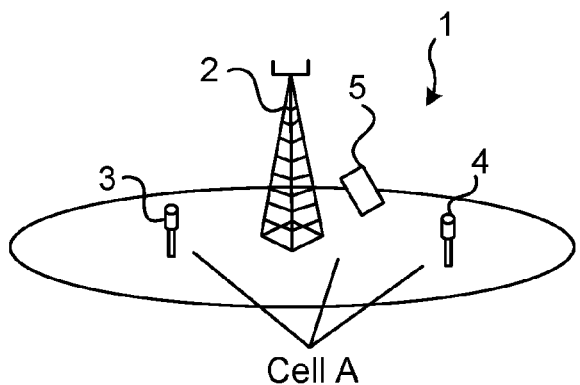
FIG. 1b illustrates a deployment scenario comprising a shared cell.

In the following description, for purposes of explanation and not limitation, specific details are set forth such as particular architectures, interfaces, techniques, etc. in order to provide a thorough understanding. In other instances, detailed descriptions of well-known devices, circuits, and methods are omitted so as not to obscure the description with unnecessary detail. Same reference numerals refer to same or similar elements throughout the description.

Figure 2:
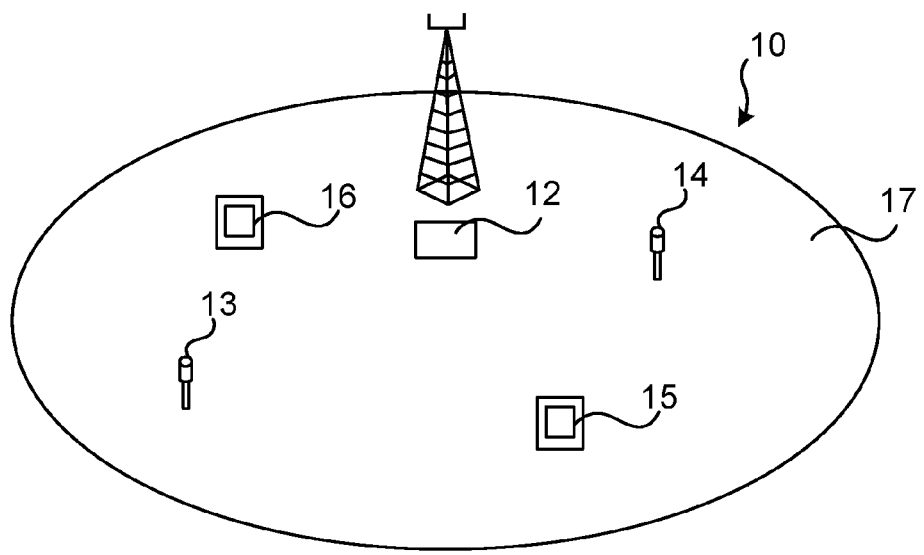
FIG. 2 illustrates schematically an environment in which embodiments of the present teachings may be implemented.

FIG. 2 illustrates schematically an environment, in particular a communication system 10, in which embodiments of the present teachings may be implemented. The communication system 10 comprises a number of network nodes 12, 13, 14 configured to provide wireless communication channels to a number of wireless devices 15, 16. The wireless devices 15, 16 may comprise any type of device configured for wireless communication. Such device may be denoted and exemplified in various ways e.g. a user equipment, a mobile communication device, subscriber terminal, and may comprise e.g. a cellular telephone, a computing device, a smart phone etc. The network nodes 12, 13, 14 may comprise heterogeneous network nodes 12, 13, 14, wherein the network nodes for example have different capabilities, functions and/or transmission power, e.g. an eNode B 12 and a number of remote radio units (RRUs) 13, 14 and/or macro 12 node and pico nodes 13, 14.

The network nodes 12, 13, 14 are configurable to form a shared cell and all thus use a common cell identification, i.e. the same cell identification is used by (/is common to) all cells. The network nodes 12, 13, 14 may for example be configured so that they all broadcast the same physical cell identity (PCI). The spatially separated network nodes 12, 13, 14 may also be denoted sectors, and the communication system 10 of FIG. 2 is illustrated as comprising three sectors 12, 13, 14, wherein each sector provides uplink and/or downlink connections to wireless devices 15, 16 located within a coverage area 17 of the sectors 12, 13, 14.

Figure 3:
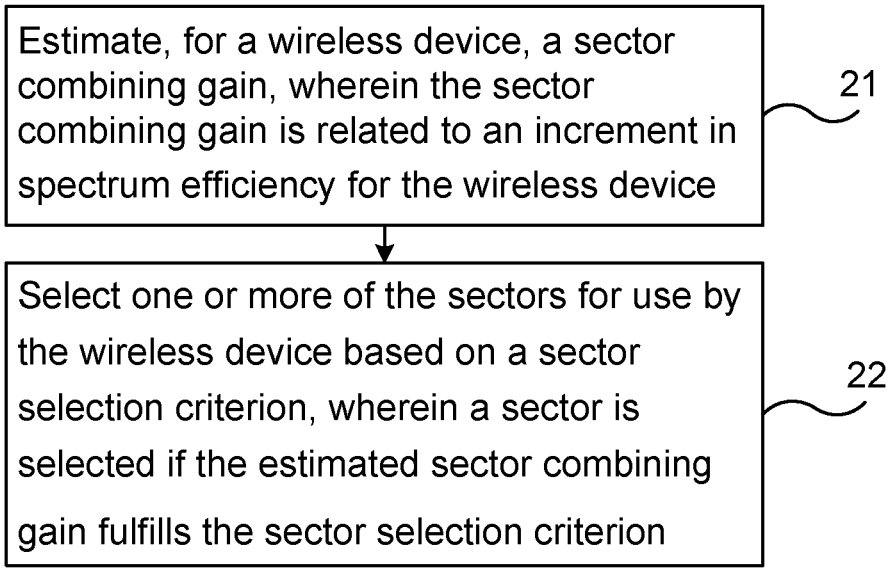
FIG. 3 illustrates a flow chart over steps of a method in a network node in accordance with the present teachings.

FIG. 3 illustrates a flow chart over steps of a method 20 in accordance with the present teachings. The method 20 for sector selection is performed in a network node 12, e.g. an eNode B, of a communication system 10, such as the communication system described with reference to FIG. 2. The communication system 10 comprises two or more sectors 12, 13, 14 using a common cell identification. The two or more sectors 12, 13, 14 each provides uplink and/or downlink connections to wireless devices 15, 16 located within a coverage area 17 of the sectors 12, 13, 14.

The method 20 comprises estimating 21, for a wireless device 15, 16, a sector combining gain, wherein the sector combining gain is related to an increment in spectrum efficiency for the wireless device 15, 16. In contrast to prior art, wherein the isolation degree, in practice the signal strength, is compared to a threshold value in determining whether a particular sector is chosen, the present method 20 looks at the increase in spectrum efficiency (measured e.g. in bit/Hz) that a particular sector would add if chosen.

The method 20 further comprises selecting 22 one or more of the sectors 12, 13, 14 for use by the wireless device 15, 16 based on an adjustable sector selection criterion, wherein a sector 12, 13, 14 is selected if the estimated sector combining gain fulfills the adjustable sector selection criterion. The adjustable sector selection criterion may be set for the wireless device 15, 16 depending e.g. on its radio condition and/or location within a sector.

By estimating a sector combining gain and using it in an adjustable sector selection criterion, problems related to the prior art use of the fixed isolation degree is overcome. In particular, in contrast to the prior art sector selection that is based on selecting a sector for the wireless device if the isolation degree is below a fixed isolation threshold (or equivalently if the signal strength to the sector is above a fixed signal strength threshold), the present method selects a sector if the gain of using the additional sector is sufficient, i.e. if the improvement provided by selecting the sector is high enough, as determined by fulfillment of the adjustable sector selection criterion. Sectors may be selected and allocated so as to optimize resource usage on a user level and/or on a communication system level. For example, if a particular wireless device 15, 16 would benefit from obtaining e.g. an additional transmission point (i.e. a sector 12, 13, 14 transmitting to the wireless device 15, 16), the cost in terms of interference to another wireless device 15, 16 may be a reason to refrain from assigning this transmission point. The gain of combing this sector with the other sectors of the wireless device is thus not high enough for the sector to be selected.

In an embodiment, the estimating 21 comprises:
determining, for each of the two or more sectors 12, 13, 14, a radio condition value for the wireless device 15, 16, and
estimating the sector combining gain based on the determined radio condition values, and wherein the selecting 22 comprises:
selecting a sector 12, 13, 14 for reception and/or transmission for the wireless device 15, 16 if the estimated sector combining gain is greater than an adjustable sector combining gain threshold.

The adjustable sector selection criterion may comprise using an adjustable sector combining gain threshold, which may be set for a particular wireless device based e.g. on its location within the sector.

In one embodiment, the adjustable sector combining gain threshold is a value adaptively depending on a radio condition. The adjustable sector combining gain threshold may for example comprise the average sector combining gain in uplink for the wireless device 15, 16, which could be based on collected statistics in the communication system.

The sector combining gain and the adjustable sector combining gain threshold can thus be adaptively depending on different radio conditions. In an exemplary embodiment, the radio condition is signal to interference plus noise ratio (SINR), and this radio condition (radio parameter) is determined for the particular wireless device towards all sectors. The sector to which the wireless device has the highest SINR ($SINR_{max}$) is selected for the wireless device and may be denoted a primary sector. The sector combining gain is, in this example, represented by transport block size (TBS) and the largest $TBS_{primary\ sector}$ that can be supported for $SINR_{max}$ is determined, for example by using a lookup-table.

The sector to which the wireless device has the second highest SINR is denoted secondary sector and is the next candidate for selection. For this sector, a SINR-based TBS is again determined, $TBS_{secondary\ sector}$, and a combining gain G is determined as $TBS_{secondary\ sector}$ divided by $TBS_{primary\ sector}$. The secondary cell is selected if the combining gain G is high enough, and this in turn is thus determined by the particular radio conditions of the wireless device. Wireless devices located in the same sector S1, may thus have different combining gains G depending on their particular radio conditions; a first wireless device might get a combining gain of 100 bits if combining the sector S1 with a second sector S2, while a second wireless device might get a combining gain of 200 bits if combining the sector S1 with the sector S2, all depending on their respective radio conditions. The sector selection is based on the increase in TBS (i.e. increment in spectrum efficiency) being high enough. A particular, non-limiting example is: when SINR=5, the adjustable combining gain threshold can be 100 bits, but for SINR=10, the adjustable combining gain threshold can be 200 bits. The first and second wireless devices in this example may be given different sector combining gain thresholds, and such flexibly set thresholds take into account the different requirements of the different wireless devices (i.e. different users).

In variations of the above embodiments, the radio condition value comprises a downlink signal to interference plus noise ratio, or an uplink signal to interference plus noise ratio (SINR).

In an embodiment, the adjustable sector selection criterion is adjusted adaptively within a sector 12, 13, 14 for the wireless devices 15, 16 located within the coverage area 17. By adaptively setting the adjustable sector selection criterion for a particular sector, problems of the known methods occurring due to the assumption that the sector selection criterion would be suitable for use throughout the sector are overcome. In particular, since it is assumed that the fixed sector selection criterion that is used today, namely isolation degree, is valid throughout the entire sector irrespective of the particular radio conditions of the various wireless devices, problems such as reduced user experience and poor resource utilization result. The method overcomes or at least alleviates this by setting the adjustable sector selection criterion in an adaptive manner within each of the different sectors.

In different variations of the above embodiment, the adjustable sector selection criterion is adjusted adaptively based on one or more of: a radio condition of the wireless device 15, 16, communication system load status and operative state of the wireless device 15, 16.

In different embodiments, the sector combining gain comprises transport block size increment, modulation and coding scheme increment, signal to interference plus noise ratio increment or data rate increment.

The sector combining gain is related to an increment in spectrum efficiency (measured in bit/Hz) and by maximizing e.g. the data rate for the users when selecting if a sector is to be used, instead of the prior art selection using signal strength maximization, a method is provided that optimizes spectrum efficiency. The spectrum efficiency (bits/Hz) can thereby be further increased significantly compared to prior art.

In an embodiment, the method 20 further comprises scheduling resources on the selected one or more sectors 12, 13, 14 to the wireless device 15, 16 in accordance with the selection. The wireless device 15, 16 may for example be scheduled with the selected sector(s) and physical resource blocks.

Next, a particular implementation example of the above described embodiments of the method 20 will be described. First, a SINR value of each sector 0, . . . , J−1 is computed for all wireless devices u=0, . . . , N−1. The following function may be used:

---
• For u=o,...,N−1
    o  for i =0...J−1
        Use a method for computing downlink SINR value of each sector o,...,J−1.
        o  end for
• end for
---

Different methods for computing downlink SINR values could be used. For example, for a Long Term Evolution (LTE) legacy wireless device in downlink, the Channel Quality Indicator (CQI) report received in the network node 12 is per wireless device, and not per sector. The CQI report is further measured on common reference signals (CRS) which are transmitted from all sectors in the cell. The $SINR_{u,i}$ for user u and sector i is computed based on the CQI report from this user u, $CQI_u$. It is further assumed that a filtered sounding reference signal (SRS) gain measurement of user u at sector i is equal to the downlink path loss of user u on sector I, and the wireless device experiences the same interference from all sectors. Then the $SINR_{u,i}$ for user u and sector i is computed based on the following equation:

$$SINR_{u,i}^{dl} = \frac{P_{tx,i} \cdot G_{u,i}^{SRS}}{(I+N)_u} \cdot G_{outerLoop,u} \quad \text{(Eq 1)}$$

$$= \frac{P_{tx,i} \cdot G_{u,i}^{SRS} \cdot CQI_u}{\sum_{j=0}^{J-1} P_{tx,j} \cdot G_{u,j}^{SRS}} \cdot G_{outerLoop,u}$$

where $$(I+N)_u = \frac{\sum_{j=0}^{J-1} P_{tx,j} \cdot G_{u,j}^{SRS}}{CQI_u}$$

and $G_{outerLoop,u}$ is an outer loop adjustment based on received downlink data acknowledgement/negative acknowledgement (ACK/NACK) from the wireless device, and $P_{tx,i}$ is the downlink transmit power of sector i.

As another example, for wireless devices configured for LTE release 10 and release 11, it is possible to report CQI per sector. Let $CQI_{u,i}$ denote channel quality for terminal u and sector i as reported by the wireless device. The downlink SINR value of terminal u and sector i can then be computed in accordance with:

$$SINR_{u,i}^{dl} = \frac{P_{tx,i} \cdot CQI_{u,i}}{P'_{tx,i}} \cdot G_{outerLoop,u},$$

where $P'_{tx,i}$ is the previous transmit power of sector i at the time of channel quality measurement report.

It is noted that a method for computing uplink SINR value of user u and sector i is similar to the above (Eq 1):

$$SINR_{u,i}^{ul} = \frac{P_u \cdot G_{u,i}^{SRS}}{(I+N)_i} \cdot G_{outerLoop,u} \cdot G_u^{IRC} \quad \text{(Eq 2)}$$

where $P_u$ is the transmit power of the wireless device u as estimated by the network node and $G_{u,i}^{SRS}$ is the filtered SRS gain measurement $G_u^{IRC}$ of user u at sector I, $(I+N)_I$ is the noise plus interference in sector I, $G_{outerLoop,u}$ is the uplink outer loop gain adjustment of user u based on uplink data ACK/NACK.

Then, the network node 12, and in particular a scheduler thereof, estimates the sector combining gain and based on the estimated sector combining gain decides if the sector is selected for the wireless device. The sector combining gain may be represented by Transport Block Size (TBS). The output of the function below is a vector S[ ], which is used to represent if the sector i is selected (i.e., S[i]=1) or not selected (i.e., S[i]=1)

Figure 4:
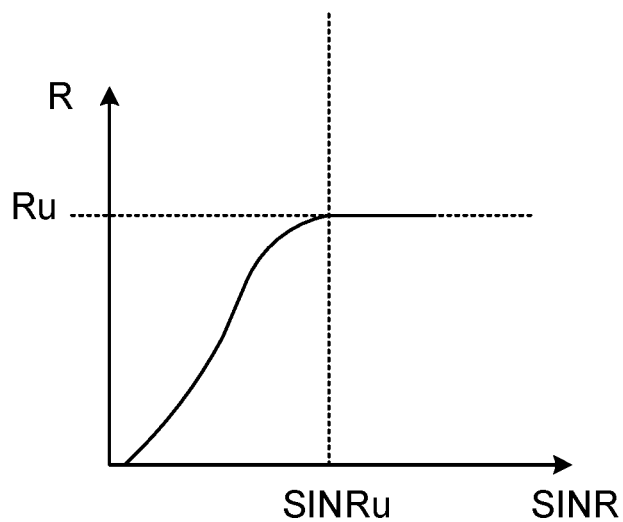
FIG. 4 illustrates transport block size as function of signal to interference plus noise ratio.

---
• For u=o, . . . , N−1
  o Calculate $SINR_{u,max} = \max_i(SINR_{u,i})$, =o...J−1 and set primarySectorIndex = i and set S[i]=1
  o    $SINR_u = SINR_{u,max}$ and compute the corresponding $TBS_u$. This may be done e.g. by referring to a look-up table or a graph, an example of which is illustrated in figure 4 (desribed later). That is, the highest TBS (in number of bits) that can be supported under the channel conditions (determined by SINR) of the user is computed.
  o    for =o. . . i−1 , and i ≠ primarySectorIndex
      □ $SINR_{u,new} = SINR_u + SINR_{u,i}$ and compute the corresponding $TBS_{new}$. This can, again, be done e.g. by referring to a graph, an example of which is illustrated in figure 4.
      □ Sector combining gain $G_i = TBS_{new}/TBS_u$
      □ if $G_i > \Delta b_u$
        • Set S[i]=1, meaning select sector i to perform reception (UL) or transmission (DL).
        • $TBS_u = TBS_{new}$
        • $SINR_u = SINR_{u,new}$
      □ end if
  o  end for
• end for
---

$\Delta b_u$ is the average sector combining gain for the user in uplink (the selective transmission gain in downlink) in bits/Hz/sector. It can be a fixed constant decided by an operator of the communication system 10. If it is set to 1, it means that as long as there is a TBS increment, even if it is small, the sector is selected. The sector combining gain of a user is thereby maximized.

The average sector combining gain $\Delta b_u$ can also be adjusted depending on the communication system requirements. For example, if the user (wireless device 15, 16) is located e.g. at the center of a sector, and thereby having very good channel conditions and the communication system load is high, $\Delta b_u$ can be set to a higher value, for example average sector combining gain of the serving cell, which may be obtained from the communication system statistics collected from the previous transmissions.

$\Delta b_u = \overline{G}$

The sector is only selected if the sector combining gain is larger than the average sector spectrum efficiency gain, otherwise, it will not be selected for the wireless device 15, 16. Fewer sectors are selected and the unselected sector can be used by the other wireless device 15, 16 to perform spatial division multiplexing (SDM). Higher system spectrum efficiency bits/Hz/system can thereby be achieved.

The average sector combining gain $\Delta b_u$ can also be set depending on the state of the wireless device 15, 16, e.g. being in a handover state. If the wireless device 15, 16 is in a handover situation/poor radio condition, for example, after handover reconfiguration radio resource control (RRC) message (e.g., configuration of measurement gap, handover command, etc), the average sector combining gain $\Delta b_u$ can be set to a lower value, e.g. equal to 1. As long as there is spectrum efficiency gain the sector is selected. Improved user link quality can thereby be achieved and better handover performance, for example success rate of handover, can be secured.

FIG. 4 illustrates transport block size as function of signal to interference plus noise ratio. This is an example of how a determination of $TBS_u$ can be made. R (y-axis) is the TBS measured in number of bits and SINR (x-axis) is the channel quality of a user. $R_u$ is the TBS (in number of bits) for user u that can be supported under the channel condition where $SINR=SINR_u$, wherein $SINR_u$ is the SINR of user u.

Figure 5:
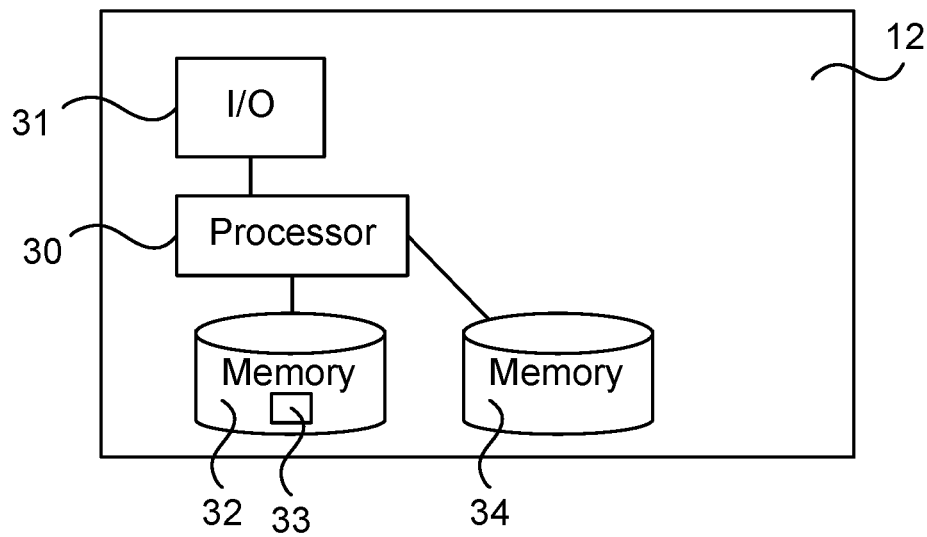
FIG. 5 illustrates schematically a network node and means for implementing methods of the present teachings.

FIG. 5 illustrates schematically a network node 12 and means for implementing methods of the present teachings. The network node 12 comprises a processor 30 comprising any combination of one or more of a central processing unit (CPU), multiprocessor, microcontroller, digital signal processor (DSP), application specific integrated circuit etc. capable of executing software instructions stored in a memory 32, which can thus be a computer program product. The processor 30 can be configured to execute any of the various embodiments of the method 20 as described in relation to FIG. 2.

In particular, a network node 12 of a communication system 10 is provided configured for sector selection. The communication system 10 comprises two or more sectors 12, 13, 14 using a common cell identification, the two or more sectors 12, 13, 14 each providing uplink and/or downlink connections to wireless devices 15, 16 located within a coverage area 17 of the sectors 12, 13, 14. The network node 12 comprises the processor 30 and memory 32, the memory 32 containing instructions executable by the processor 30, whereby the network node 12 is operative to:
  estimate, for a wireless device 15, 16, a sector combining gain, wherein the sector combining gain is related to an increment in spectrum efficiency for the wireless device 15, 16, and
  select one or more of the sectors 12, 13, 14 for use by the wireless device 15, 16 based on an adjustable sector selection criterion, wherein a sector 12, 13, 14 is selected if the estimated sector combining gain fulfills the adjustable sector selection criterion.

In an embodiment, the network node 12 is configured to estimate by:
  determining, for each of the two or more sectors 12, 13, 14, a radio condition value for the wireless devices 15, 16, and
  estimating the sector combining gain based on the determined radio condition values, and wherein the network node 12 is configured to select by:
  selecting a sector 12, 13, 14 for reception and/or transmission for the wireless device 15, 16 if the estimated sector combining gain is greater than an adjustable combining gain threshold.

In a variation of the above embodiment, the radio condition value comprises a downlink signal to interference plus noise ratio or an uplink signal to interference plus noise ratio.

In an embodiment, the network node 12 is configured to adjust the adjustable sector selection criterion adaptively within a sector 12, 13, 14 for the wireless devices 15, 16 located within the coverage area 17.

In a variation of the above embodiment, the network node 12 is configured to adjust the adjustable sector selection criterion adaptively based on one or more of: a radio condition of the wireless device 15, 16, network load status and operative state of the wireless device 15, 16.

In an embodiment, the sector combining gain comprises transport block size increment, modulation and coding scheme increment, signal to interference plus noise ratio increment or data rate increment.

Still with reference to FIG. 5, the memory 32 can be any combination of read and write memory (RAM) and read only memory (ROM). The memory 32 also comprises persistent storage, which, for example, can be any single one or combination of magnetic memory, optical memory, solid state memory or even remotely mounted memory.

A data memory 34 may also be provided for reading and/or storing data during execution of software instructions in the processor 30. The data memory 34 can be any combination of read and write memory (RAM) and read only memory (ROM).

The network node 12 further comprises an input/output (I/O) device 31 operatively connected to the processor 30. The I/O device 31 is configured to receive/transmit signaling from/to the wireless devices 15, 16 using other intermediate devices, e.g. antennas. The I/O device 31 is also typically configured to communicate with other network nodes through wired connections, e.g. backhaul connections. Although illustrated in the FIG. 5 as a single unit, the I/O device may alternatively comprise several units, and it may be implemented in hardware and/or software.

The present teachings also comprise computer program 33 for a network node 12 of a communication system 10 configured for sector selection. The communication system 10 comprises two or more sectors 12, 13, 14 using a common cell identification, and the two or more sectors 12, 13, 14 each provide uplink and/or downlink connections to wireless devices 15, 16 located within a coverage area 17 of the sectors 12, 13, 14. The computer program 33 comprises computer program code, which, when run on the network node 12 causes the network node 12 to:
  estimate, for a wireless device 15, 16, a sector combining gain, wherein the sector combining gain is related to an increment in spectrum efficiency for the wireless device 15, 16, and
  select one or more of the sectors (12, 13, 14) for use by the wireless device 15, 16 based on an adjustable sector selection criterion, wherein a sector 12, 13, 14 is selected if the estimated sector combining gain fulfills the adjustable sector selection criterion.

The teachings of the present application also encompasses such computer program product 32 comprising a computer program 33 as described above, and a computer readable means on which the computer program 34 is stored. The computer program product 32 may be any combination of read and write memory (RAM) or read only memory (ROM). The computer program product 35 may also comprise persistent storage, which for example can be any single one or combination of magnetic memory, optical memory or solid state memory.

The computer program product 32, or the memory 32, thus comprises instructions executable by the processor 30. Such instructions may be comprised in a computer program 33, or in one or more software modules or function modules.

Figure 6:
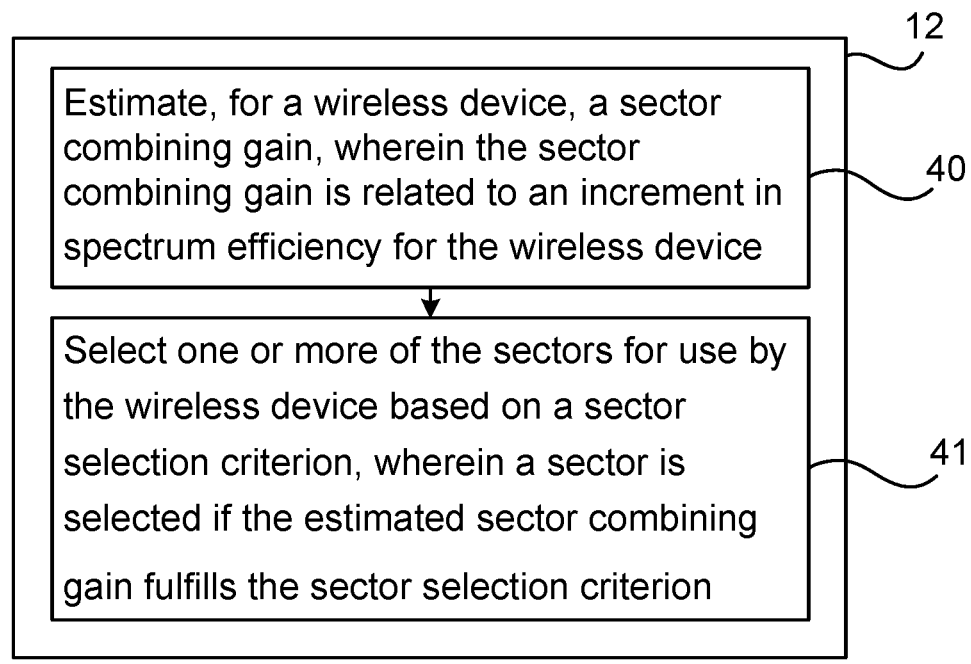
FIG. 6 illustrates a network node comprising functions modules/software modules for implementing methods of the present teachings.

FIG. 6 illustrates a network node 12 comprising functions modules/software modules for implementing methods as has been described.

An example of an implementation using functions modules/software modules is illustrated in FIG. 6, in particular illustrating a network node 12 comprising functions modules for implementing methods as described. The network node 12 comprises means 40, in particular a first function module 40, for estimating, for a wireless device, a sector combining gain, wherein the sector combining gain is related to an increment in spectrum efficiency for the wireless device 15, 16. The network node 12 comprises means 41, in particular a second function module 41, for selecting one or more of the sectors 12, 13, 14 for use by the wireless device 15, 16 based on an adjustable sector selection criterion, wherein a sector 12, 13, 14 is selected if the estimated sector combining gain fulfills the adjustable sector selection criterion.

The functions modules 40, 41 can be implemented using software instructions such as computer program executing in a processor and/or using hardware, such as application specific integrated circuits, field programmable gate arrays, discrete logical components etc.

Reverting now to the earlier mentioned prevailing prior art assumption that the isolation requirement is the same in the entire cell. In reality, the isolation requirement might be different for different users in a cell and the present teachings could be applied also to this. For example, for a wireless device that has good radio conditions a lowered isolation degree requirement would lead to the wireless device having fewer reception sectors but higher chances of being multiplexed with other wireless devices in different sectors. On the other hand, an increased isolation requirement for wireless devices in poor radio conditions would lead to more sectors being selected for performing reception and to get better reception combining gain for this wireless device. Setting the isolation degree in an adjustable and possibly also adaptive manner would improve the situation.

The invention has mainly been described herein with reference to a few embodiments. However, as is appreciated by a person skilled in the art, other embodiments than the particular ones disclosed herein are equally possible within the scope of the invention, as defined by the appended patent claims.

The invention claimed is:

1. A method for sector selection performed in a network node of a communication system, the communication system comprising two or more sectors using a common cell identification, the two or more sectors each providing uplink and/or downlink connections to wireless devices located within a coverage area of the sectors, the method comprising:
   estimating, for a wireless device, a sector combining gain, wherein the sector combining gain is related to an increment in spectrum efficiency for the wireless device, and
   selecting one or more of the sectors for use by the wireless device based on an adjustable sector selection criterion, wherein a sector is selected if the estimated sector combining gain fulfills the adjustable sector selection criterion,
   wherein the estimating further comprises:
   determining, for each of the two or more sectors, a radio condition value for the wireless device, and
   estimating the sector combining gain based on the determined radio condition values, and
   wherein the selecting comprises:
   selecting a sector for reception and/or transmission for the wireless device if the estimated sector combining gain is greater than an adjustable combining gain threshold.

2. The method as claimed in claim 1, wherein the adjustable combining gain threshold is a value adaptively depending on a radio condition.

3. The method as claimed in claim 1, wherein the radio condition value comprises a downlink signal to interference plus noise ratio or an uplink signal to interference plus noise ratio.

4. The method as claimed in claim 1, wherein the adjustable sector selection criterion is adjusted adaptively within a sector for the wireless devices located within the coverage area.

5. The method as claimed in claim 4, wherein the adjustable sector selection criterion is adjusted adaptively based on one or more of: a radio condition of the wireless device, network load status and operative state of the wireless device.

6. The method as claimed in claim 1, wherein the sector combining gain comprises transport block size increment, modulation and coding scheme increment, signal to interference plus noise ratio increment or data rate increment.

7. The method as claimed in claim 1, comprising scheduling resources on the selected one or more sectors to the wireless device.

8. A network node of a communication system configured for sector selection, the communication system comprising two or more sectors using a common cell identification, the two or more sectors each providing uplink and/or downlink connections to wireless devices located within a coverage area of the sectors, the network node comprising:
   a processor; and
   memory, the memory containing instructions executable by the processor, whereby the network node is operative to:
   estimate, for a wireless device, a sector combining gain, wherein the sector combining gain is related to an increment in spectrum efficiency for the wireless device, and
   select one or more of the sectors for use by the wireless device based on an adjustable sector selection criterion, wherein a sector is selected if the estimated sector combining gain fulfills the adjustable sector selection criterion,
   wherein the network node is further configured to estimate by:
   determining, for each of the two or more sectors, a radio condition value for the wireless devices, and
   estimating the sector combining gain based on the determined radio condition values, and
   wherein the network node is further configured to select by:
   selecting a sector for reception and/or transmission for the wireless device if the estimated sector combining gain is greater than an adjustable combining gain threshold.

9. The network node as claimed in claim 8, wherein the radio condition value comprises a downlink signal to interference plus noise ratio or an uplink signal to interference plus noise ratio.

10. The network node as claimed in claim 8, wherein the network node is configured to adjust the adjustable sector selection criterion adaptively within a sector for the wireless devices located within the coverage area.

11. The network node as claimed in claim 10, wherein the network node is configured to adjust the adjustable sector selection criterion adaptively based on one or more of: a radio condition of the wireless device, network load status and operative state of the wireless device.

12. The network node as claimed in claim 8, wherein the sector combining gain comprises transport block size increment, modulation and coding scheme increment, signal to interference plus noise ratio increment or data rate increment.

13. A non-transitory computer readable medium having stored thereon a computer program for a network node of a communication system configured for sector selection, the communication system comprising two or more sectors using a common cell identification, the two or more sectors each providing uplink and/or downlink connections to wireless devices located within a coverage area of the sectors, the computer program comprising computer program code, which, when run on the network node causes the network node to:

estimate, for a wireless device, a sector combining gain, wherein the sector combining gain is related to an increment in spectrum efficiency for the wireless device, and select one or more of the sectors for use by the wireless device based on an adjustable sector selection criterion, wherein a sector is selected if the estimated sector combining gain fulfills the adjustable sector selection criterion, wherein the network node is further configured to estimate by:
  determining, for each of the two or more sectors, a radio condition value for the wireless devices, and
  estimating the sector combining gain based on the determined radio condition values, and wherein the network node is further configured to select by:
  selecting a sector for reception and/or transmission for the wireless device if the estimated sector combining gain is greater than an adjustable combining gain threshold.

* * * * *